United States Patent [19]

Testa

[11] 3,755,264
[45] Aug. 28, 1973

[54] MALEIC ANHYDRIDE COPOLYMERS AND METHOD OF MAKING

[75] Inventor: Anthony J. Testa, Westwood, Mass.

[73] Assignee: Amicon Corporation, Lexington, Mass.

[22] Filed: July 30, 1971

[21] Appl. No.: 167,823

[52] U.S. Cl. ........................ 260/78.5 R, 260/78.5 T
[51] Int. Cl. .............................................. C08f 15/14
[58] Field of Search ............... 260/78.5 R, 78.4 R

[56] References Cited
UNITED STATES PATENTS

| | | | |
|---|---|---|---|
| 3,388,106 | 6/1968 | Muskat | 260/78.5 |
| 2,971,939 | 2/1961 | Baer | 260/45.5 |
| 3,635,915 | 1/1972 | Gale | 260/78.5 R |
| 3,359,246 | 12/1967 | Berry | 260/78.4 |

*Primary Examiner*—Joseph L. Schofer
*Assistant Examiner*—John Kight, III
*Attorney*—R. W. Furlong

[57] ABSTRACT

Copolymer of 99 to 85 mol percent of maleic anhydride with from 1 to 15 mol percent of acrylic acid, vinyl acetate, styrene, or mixtures thereof, and hydrolyzed analogous copolymers of maleic acid or maleic salts are highly effective chelating agents. They are made by slowly combining a solution containing the acrylic acid, vinyl acetate, or styrene and a large amount of free radical initiator with a solution containing the maleic anhydride.

9 Claims, No Drawings

MALEIC ANHYDRIDE COPOLYMERS AND METHOD OF MAKING

This invention relates to novel copolymers of 99 to 85 mol percent of maleic anhydride with from 1 to 15 mol percent, preferably from 5 to 15 mol percent, of acrylic acid, vinyl acetate, styrene, or mixtures thereof, as well as to hydrolyzed analogous copolymers of maleic acid or maleic salts, and the method of making such copolymers.

Copolymers of maleic anhydride with various ethylenically unsaturated monomeric materials have in the past been made by a variety of procedures, but generally, regardless of the proportions of monomers employed, the resulting copolymers contain a molar amount of combined maleic anhydride which is substantially equal to the molar amount of the remaining combined monomers. Homopolymers of maleic anhydride have also been prepared.

The copolymers of the present invention can be made by a simple and inexpensive process which can be readily controlled, and these copolymers possess a unique combination of properties in that they exhibit highly effective chelating propensities for certain metallic ions, such as iron, copper, magnesium, or calcium in particular, even at concentrations as low as 10 p.p.m. or less, while at the same time forming solutions of high stability in alkaline aqueous media. This combination of properties renders the copolymers particularly useful as scale inhibitors in water systems, e.g., inhibitors of boiler scale, and renders them superior to maleic anhydride homopolymers as well as to the copolymers previously known containing smaller proportions of combined maleic anhydride.

The copolymers of the present invention are made by copolymerizing maleic anhydride with acrylic acid, vinyl acetate, or styrene or mixtures, as the case may be; the resultant copolymer may be converted by hydrolysis to the analogous maleic acid or maleic salt copolymer. The maleic anhydride copolymers may be made by carrying out the polymerization reaction at temperatures from 100° to 145°C., preferably from 110° to 145°C. with the monomers dissolved in a liquid anhydrous organic solvent which is inert to, i.e., does not react chemically with the monomers, and which preferably has a boiling point above the temperature at which the polymerization is carried out, and by using a large amount of conventional free-radical initiator, at least 6 percent by weight based on the total weight of monomers, preferably 7 to 8 percent by weight, and by combining gradually a solution containing the initiator and the acrylic acid, vinyl acetate, or styrene (or mixture) with a solution of the maleic anhydride, the former solution being introduced continuously or in spaced small increments each no more than 10 percent of the total, into the entire maleic anhydride solution, with the introduction being extended at an approximately constant rate over a period of at least three hours. If the amount of initiator is less than 6 percent or if the rate of combination is increased (i.e., the time of combining is decreased), the extent of conversion, i.e., the yield of copolymer, is substantially decreased.

The relative proportions of total monomers used should be approximately the same as the relative proportions desired in the finished copolymer. Monomeric material which fails to polymerize under these conditions, as in those cases where conversion is less than 100 percent, is virtually all maleic anhydride, so that a conversion of about 90 percent or more of the total monomer during polymerization results in a copolymer in which the molar ratio of combined monomers is nearly identical to the molar ratio of monomers in the starting solutions.

The identity and relative proportion of solvent in each solution is not critical provided that the solvent is inert to and does not react chemically with the monomers or the initiator. It is usually most convenient to use the same solvent in both solutions. A variety of anhydrous liquid organic solvents can be used including aromatic hydrocarbons and saturated aliphatic hydrocarbons such as isohexadecane, isopentacosane, and isotriacontane and mixtures thereof; particularly desirable are the liquid aromatic hydrocarbon solvents such as benzene, toluene, xylenes, isopropylbenzene, diisopropylbenzene, ethylbenzene, 1,2,4-trimethylbenzene, butylbenzene, or mixtures thereof. In order to carry out polymerization within the specified temperature range and at atmospheric pressure, which is desirable, the solvent must have a boiling point at least as high as the polymerization temperature. While lower boiling solvents can be used by carrying out the polymerization at elevated pressure, this is more expensive and less desirable. Different solvents can be used for each monomer provided that they are miscible and provided that the mixed solvents are capable of dissolving both monomers as well as the copolymer. The relative proportion of solvent and of monomeric materials can be varied widely, so that the initial concentration of monomer in solution may be from 5 to 60 percent by weight of the solution.

Any conventional free-radical generator can be used as the initiator of polymerization, the materials of choice being organic per-compounds such as diisopropyl percarbonate, di-cyclohexylpercarbonate, benzoyl peroxide, dicumyl peroxide, acetyl peroxide, caprylyl peroxide, di-teriary-butyl peroxide, as well as azoisobutyronitrile, and the like. For best results, the initiator should be dissolved in the solution of acrylic acid, vinyl acetate, or styrene before this solution is mixed with the maleic anhydride solution. While the total initiator used must amount to at least 6 percent by weight of the total monomeric material including maleic anhydride in order to achieve the desired high yield, and 7 to 8 percent by weight of initiator is preferred, there is no specific upper limit on the amount of initiator. However, there is no advantage in using more than about 8 percent, any excess being wasted.

For best results, the solution of initiator together with acrylic acid, vinyl acetate, or styrene should not be heated to the reaction temperature (100° to 145°C.) until it is mixed with the maleic anhydride solution. This can be accomplished by maintaining the relatively large mass of maleic anhydride solution at the desired polymerization temperature, while keeping the second solution at room temperature until the two solutions are mixed, or by maintaining both the maleic anhydride solution and a separate solution of the other monomer at the desired polymerization temperature but dissolving the initiator in the second solution just before the mixing takes place.

It is also desirable to follow the conventional procedure of eliminating oxygen from the atmosphere with which the monomeric solutions are in contact while the polymerization is occurring. This can be accomplished by the usual procedure of purging the polymerization vessel with nitrogen or other inert oxygen-free gas and continuing a slow flow of nitrogen or other such gas through the vessel throughout the polymerization reaction. Any conventional mixing device can be used such as a propeller to achieve the desired rapid and complete mixing of the two solutions.

After mxing of the solutions of monomeric materials has been completed, the mixture should preferably be maintained at a temperature of 100° to 45°C. for at least about thirty minutes to ensure copolymerization of the monomeric material last added.

When the polymerization has been completed, the desired copolymer is present in anhydrous solution along with a small amount of residual initiator and a small amount (usually than 10 percent by weight) of residual unpolymerized monomeric material which consists substantially completely of maleic anhydride.

The copolymers can be isolated from the dispersion by filtering and drying in air. They have a number average molecular weight which is at least 300 and may be as high as 100,000 or even higher. They can be hydrolyzed in the same manner as other maleic anhydride polymers and copolymers. For example, simply heating the copolymers in water at 50° to 100°C. for somewhat less than an hour results in complete hydrolysis of the anhydride groups; at 25°C., complete hydrolysis requires about 25 hours. The copolymer also can be extracted from the anhydrous solution by hot water with concomitant hydrolysis of the anhydride units to the carboxylic acid form. Whether in the anhydride or hydrolyzed form the copolymer is very soluble in water, and is readily converted in whole or in part to salt form (including mono- and di-salts of such cations as sodium, lithium, potassium, rubidium, cesium, and ammonium) or to mono- or di-esters, amides, imides, and the like by conventional methods. If the appropriate base is reacted with the anhydride polymer, the mono- or di-salt may be formed directly. In the case of the acrylic acid copolymer, the acrylic acid groups may also be present in the form of salts, esters, etc.

The following specific examples are intended to illustrate more clearly the nature of the invention without acting as a limitation upon its scope.

EXAMPLE 1

There were introduced into a steam jacketed kettle 1100 parts by weight of dry toluene and 1,000 parts of maleic anhydride. The air remaining in the kettle was purged with nitrogen, the flow of nitrogen being continued throughout the subsequent polymerization reaction. The kettle was heated to reflux temperature, about 123°C., and the contents were mixed until the maleic anhydride was completely dissolved.

In 700 parts by weight of toluene were dissolved 100 parts by weight of glacial acrylic acid and 80 parts of benzoyl peroxide. This solution was introduced by gravity feed dropwise into the kettle, the rate of introduction being adjusted so that the total time required for introduction was four hours. The temperature of the liquid mix decreased from 123°C., the initial temperature at reflux, to approximately 116°C. after mixing of the two solutions had been completed. Heating of the mixture at the reflux temperature of 116°C. was continued for approximately 30 minutes.

The resulting copolymer, containing approximately 88.1 mol percent maleic anhydride and the balance combined acrylic acid precipitated from the toluene immediately as it was formed producing a dispersion of the copolymer in toluene. The conversion was approximately 93 percent of the theoretical.

The dispersion of the copolymer in toluene was filtered and the recovered unhydrolyzed copolymer was dried in a forced draft air oven for 12 hours at 125°C. The product was a white friable powder having a number average molecular weight of 840 as determined by vapor osmometry.

When the rate of addition of the acrylic acid solution was increased to provide completion of the mixing in three hours, the conversion was only 77 percent of the theoretical. Similarly, when the amount of benzoyl peroxide present was reduced to 60 parts by weight (without any other change in the process), the conversion dropped to 59 percent of the theoretical.

EXAMPLE 2

There were charged to a kettle equipped with a reflux condenser, 50 parts by weight of the dried copolymer described in Example 1 and 50 parts by weight of water. The mixture was heated under reflux until the copolymer was completely hydrolyzed to the acid form. The resulting solution of maleic acid/acrylic acid copolymer was light yellow in color.

The solution was dried at 50°C. in a forced draft air oven for 12 hours to produce the hydrolyzed copolymer in the form of a white friable powder.

EXAMPLE 3

To the toluene dispersion of the copolymer prepared as in Example 1, there were added approximately 3000 parts by weight of water while maintaining the mixture at approximately 90°C. The copolymer was hydrolyzed and extracted into the aqueous phase producing an aqueous polymer solution, light in color, containing the hydrolyzed form of the copolymer. The aqueous polymer solution was then separated from the toluene by decanting the toluene.

EXAMPLE 4

The procedure described in Example 1 was repeated except that the amount of glacial acrylic acid was 39 parts by weight to provide a copolymer containing 93.7 mol percent combined maleic anhydride. The conversion, after 6 hours heating, was 90 percent, and the inherent viscosity of the copolymer (1 percent solution in dioxane at 25°C.) was 3.44.

EXAMPLE 5

The procedure described in Example 1 was repeated except that the amount of glacial acrylic acid was 19.5 parts by weight to provide a copolymer containing 96.6 mol percent combined maleic anhydride. The conversion, after 6 hours heating, was 91 percent and the inherent viscosity of the copolymer (1 percent solution in dioxane at 25°C.) was 3.97.

EXAMPLE 6

The procedure described in Example 3 was repeated except that 25 parts by weight of styrene were substituted for the glacial acrylic acid and the amount of benzoyl peroxide adjusted to maintain the same initiator/monomer molar ratio to provide a copolymer containing 97.3 mol percent combined maleic acid, the remainder being combined styrene.

EXAMPLE 7

The procedure described in Example 1 was repeated except that 50 parts by weight of vinyl acetate were substituted for the glacial acrylic acid and the concentration of benzoyl peroxide was adjusted to maintain the same initiator/monomer molar ratio to provide a copolymer containing 93.7 mol percent combined maleic anhydride, the remainder being combined vinyl acetate. The same product was obtained when benzene was substituted for the toluene.

EXAMPLE 8

The procedure described in Example 1 was repeated except that 100 parts by weight of vinyl acetate were substituted for the glacial acrylic acid to provide a dispersion of copolymer containing 89.7 mol percent combined maleic acid, the remainder being combined vinyl acetate.

The effectiveness of the copolymers as scale inhibitors was demonstrated by mixing equal volumes of aqueous solutions containing 1.96 percent of calcium chloride and 2.5 percent of sodium sulfate to provide a brine containing 12,000 p.p.m. calcium sulfate. This brine was stirred at 95°C. and the calcium sulfate remaining in solution was determined after periods of 4, 24, and 48 hours respectively. Other brine specimens were similarly prepared and tested except that varying amounts of the copolymers of Examples 1 and 5 were added to the calcium chloride solution before mixing, the amounts being expressed in the following table in p.p.m. of the total brine solution. The results were as follows:

| copolymer of example | quantity, ppm. | calcium sulfate in solution | | |
|---|---|---|---|---|
| | | 4 hrs. | 24 hrs. | 48 hrs. |
| 1 | 1 | 3700 | 3050 | 3670 |
| | 5 | 4320 | 4250 | 4080 |
| | 10 | 11100 | 10265 | 10070 |
| | 20 | 11300 | 11350 | 11290 |
| 5 | 1 | 3540 | 3265 | 3265 |
| | 5 | 3950 | 3050 | 3400 |
| | 10 | 11200 | 6665 | 5780 |
| | 20 | 9600 | 4490 | 4490 |
| control (no sequestrant) | 0 | 3265 | 3260 | 3000 |

Further to illustrate the sequestering ability of these copolymers and their salts, 100 mg. of the respective copolymers or their salts were dissolved in 100 ml. of water to form a sequestrant solution. The pH was adjusted to a value of 10 and maintained at this value throughout the test with caustic. Aqueous metal ion solutions containing 1 mg. of metal ion per ml. of solution were added to the sequestrant solution until a precipitate persisted. The results are expressed as parts by weight of metal sequestered per 100 parts of copolymer or salt, as follows:

| | copolymer of Example | Iron | Manganese |
|---|---|---|---|
| Polymaleic Acid (control) | - | 76 | 39 |
| | 1 | 103 | 42 |
| | 4 | 110 | 43 |
| Sodium Salt of Copolymer | 1 | 103 | 41 |
| Ammonium Salt of Copolymer | 1 | 102 | 41 |
| | 6 | 103 | - |
| | 7 | 107 | - |
| | 8 | 127 | - |

In general, the copolymer, in the form of a 0.1 to 5 percent by weight aqueous solution, can be mixed with the material containing the ion to be sequestered, for example boiler water, paper pulp, etc., in an amount sufficient to provide a concentration from 10 to 5000 p.p.m. to produce the desired result, although the exact minimum required varies depending upon the identity and amount of metal ion, the pH of the material, the temperature, etc.

The salts of the copolymers of the present invention display remarkably high electroconductivity, comparable to that of cationic polymers instead of to the lower electroconductivity of other anionic polymers. This characteristic makes them useful for coating paper used in electrographic printing. For example, paper coated from solution with any of the disalts (lithium, sodium, potassium or ammonium) of a copolymer containing 87 mole percent maleate, the balance acrylate, at the rate of 3–9 lb./ream, displayed surface resistivities of the order of $10^{10}$ to $10^{12}$ ohm/sq. at 80°F. and 15 percent R.H., the dipotassium salt being the best.

What is claimed is:

1. A member of the group consisting of (1) a copolymer acrylic from 85 to 99 mol percent of combined maleic anhydride, the balance being a member of the group consisting of acrylic acid, vinyl acetate, styrene, and mixtures thereof; (2) a hydrolyzed form of said copolymer in which at least a portion of the anhydride groups are in the form of acid groups; (3) a salt of said hydrolyzed form and (4) mixtures thereof. Said copolymer having a number average molecular weight of at least 300.

2. A copolymer as claimed in claim 1 in which said member is acrylic acid.

3. A copolymer as claimed in claim 1 in which said member is vinyl acetate.

4. A copolymer as claimed in claim 1 in which said member is styrene.

5. A copolymer as claimed in claim 1 in which the mol percent is from 85 to 95.

6. A process for making a copolymer as claimed in claim 1 in which process comprises providing a solution of maleic anhydride in an anhydrous liquid organic solvent, mixing with said solution slowly, over a period of at least 3 hours, a solution containing in an anhydrous liquid organic solvent miscible with said first solvent a free-radical generator and a member of the group consisting of acrylic acid, vinyl acetate, styrene and mixtures thereof, the amount of said free-radical generator being at least 6 percent by weight of the total monomer and the amount of said member being from 1 to 15 mol percent of the total monomer, while maintaining the temperature of said mixed solution at 100° to 145°C.

7. A process as claimed in claim 6 in which said member is scrylic acid.

8. A process as claimed in claim 6 in which said member is vinyl acetate.

9. A process as claimed in claim 6 in which said member is styrene.

* * * * *

UNITED STATES PATENT OFFICE
CERTIFICATE OF CORRECTION

Patent No. 3,755,264　　　　　　　　　　Dated August 28, 1973

Inventor(s)　Anthony J. Testa

It is certified that error appears in the above-identified patent and that said Letters Patent are hereby corrected as shown below:

In the Abstract, line 1, "Copolymer" should be plural;

Column 6, line 27, "acrylic" should be --containing--;

Column 6, line 45, after "claim 1", delete "in".

Signed and sealed this 27th day of November 1973.

(SEAL)
Attest:

EDWARD M. FLETCHER, JR.　　　　　　RENE D. TEGTMEYER
Attesting Officer　　　　　　　　　　Acting Commissioner of Patents